United States Patent
Zhao et al.

(10) Patent No.: US 10,122,973 B2
(45) Date of Patent: Nov. 6, 2018

(54) FLUOROSCOPIC INSPECTION METHOD, DEVICE AND STORAGE MEDIUM FOR AUTOMATIC CLASSIFICATION AND RECOGNITION OF CARGOES

(71) Applicant: Nuctech Company Limited, Beijing (CN)

(72) Inventors: Ziran Zhao, Beijing (CN); Yaohong Liu, Beijing (CN); Jianping Gu, Beijing (CN); Qiang Li, Beijing (CN); Jian Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 795 days.

(21) Appl. No.: 14/580,488

(22) Filed: Dec. 23, 2014

(65) Prior Publication Data

US 2015/0189239 A1 Jul. 2, 2015

(30) Foreign Application Priority Data

Dec. 27, 2013 (CN) .......................... 2013 1 0734373

(51) Int. Cl.
*G06T 7/00* (2017.01)
*H04N 7/18* (2006.01)
(Continued)

(52) U.S. Cl.
CPC .............. *H04N 7/18* (2013.01); *G01V 5/0016* (2013.01); *G06K 9/00624* (2013.01);
(Continued)

(58) Field of Classification Search
CPC .............. G06K 9/00624; G06T 7/0004; G06T 2207/10121
(Continued)

(56) References Cited

U.S. PATENT DOCUMENTS 9,659,364 B2 * 5/2017 Pekar ..................... G06T 7/0012
2006/0257005 A1 11/2006 Bergeron et al.
(Continued)

FOREIGN PATENT DOCUMENTS

CN 2632671 Y 8/2004
CN 101389004 A 3/2009
(Continued)

OTHER PUBLICATIONS

Chinese Patent Application No. 101900695 A, dated Dec. 1, 2010, together with an English-language abstract.
(Continued)

*Primary Examiner* — Jeffery A Williams
(74) *Attorney, Agent, or Firm* — Scully Scott Murphy & Presser

(57) ABSTRACT

The present disclosure relates to a fluoroscopic inspection system for automatic classification and recognition of cargoes. The system includes: an image data acquiring unit, configured to perform scanning and imaging for a container by using an X-ray scanning device to acquire a scanned image; an image segmenting unit, configured to segment the scanned image into small regions each having similar gray scales and texture features; a feature extracting unit, configured to extract features of the small regions; a training unit, configured to generate a classifier according to annotated images; and a classification and recognition unit, configured to recognize the small regions by using the classifier according to the extracted features, to obtain a probability of each small region pertaining to a certain category of cargoes, and merge small regions to obtain large regions each representing a category.

15 Claims, 1 Drawing Sheet

(51) Int. Cl.
  *G01V 5/00* (2006.01)
  *G06K 9/00* (2006.01)
  *G06K 9/46* (2006.01)

(52) U.S. Cl.
  CPC .......... *G06K 9/4676* (2013.01); *G06T 7/0004* (2013.01); *G06K 2209/09* (2013.01); *G06T 2207/10121* (2013.01); *G06T 2207/20076* (2013.01); *G06T 2207/20081* (2013.01); *G06T 2207/30112* (2013.01)

(58) Field of Classification Search
  USPC .......................................................... 348/43
  See application file for complete search history.

(56) References Cited

U.S. PATENT DOCUMENTS

| | | |
|---|---|---|
| 2009/0174554 A1 | 7/2009 | Bergeron et al. |
| 2009/0323894 A1 | 12/2009 | Hu et al. |
| 2010/0111428 A1* | 5/2010 | Yu .................... G06F 17/30265 382/228 |
| 2012/0219214 A1* | 8/2012 | Bao ......................... H04N 1/60 382/164 |

FOREIGN PATENT DOCUMENTS

| | | |
|---|---|---|
| CN | 101900695 A | 12/2010 |
| CN | 102175698 A | 9/2011 |
| CN | 103345631 A | 10/2013 |

OTHER PUBLICATIONS

Chinese Patent Application No. 101389004 A, dated Mar. 18, 2009, together with an English-language abstract.
Chinese Patent Application No. 2632671 Y, dated Aug. 11, 2004, together with an English-language abstract.
Chinese Patent Application No. 102175698 A, dated Sep. 7, 2011, together with an English-language abstract.
United States Patent Application Publication No. US 2009/0323894 A1, published Dec. 31, 2009 to Hu et al.
International Search Report dated Mar. 25, 2015 received from International Application No. PCT/CN2014/094494.
Gonzalez R C et al., "Chapter 10 (Image Segmentation)", Digital Image Processing, Prentice-Hall Upper Saddle River, NJ, USA, pp. 567-642, XP008148051, ISBN: 978-0-13-094650-8 (Jan. 1, 2002).
European Search Report dated Nov. 29, 2016 received in European Application No. 14 200 148.6.
Bastan M. et al., "Visual Words on Baggage X-Ray Images", Computer Analysis of Images and Patterns, Springer Berlin Heidelberg, Berlin, Heidelberg, pp. 360-368 (Aug. 29, 2011).
Mery D., "X-Ray Testing: The State of the Art", The e-Journal of Non-Destructive Testing & Ultrasonics, pp. 1-12, Retrieved from the Internet: URL:http://www.ndt.net/article/ndtnet/2013/1_Mery.pdf (Sep. 1, 2013).
Extended European Search Report dated May 11, 2015 received from Application No. 14200148.6.
Okumura, T., et al., "Generic Object Recognition by Tree Conditional Random Field based on Heirarchial Segmentation" IS3-32 : 1779-1783 (2010).

* cited by examiner

FLUOROSCOPIC INSPECTION METHOD, DEVICE AND STORAGE MEDIUM FOR AUTOMATIC CLASSIFICATION AND RECOGNITION OF CARGOES

This application is based on and claims the priority of the Chinese application No. 2013107343730.7, filed on Dec. 27, 2013, the entire contents of which are incorporated herein by reference.

TECHNICAL FIELD

The present disclosure relates to a security inspection system for imaging containers by fluoroscopy, in particular, relates to an automatic analysis and intelligent inspection method for bulk cargoes in containers, an automatic classification and recognition method for bulk cargoes in containers, and semantic segmentation and categorization of scanned images of bulk cargoes; and further, relates to intelligent inspection methods such as analysis of illegally smuggled cargoes in containers, estimation of quantities of cargoes, tax amount computation, and the like, and to a relevant storage medium.

BACKGROUND

Intelligent inspection is an inevitable trend in the field of container security inspection. Automatic classification and recognition of cargoes is an essential component of the intelligent inspection. At present, material recognition technologies based on energy spectrum analysis include X-ray dual energy material recognition technology and neutron-X-ray technology. The dual energy technology is only capable of recognizing organic matters, inorganic matters, mixtures, and heavy metals, which covers a narrow range of categories. The neutron-X-ray technology is capable of recognizing a wide range of categories. However, the neutron generator is very expensive, and the neutron rays are subject to difficult protection and have poor penetration for organic matters. Due to these defects, the neutron-X-ray technology is difficult to be applied in the security inspection of cargoes in containers.

Researches on the automatic classification and recognition technology of cargoes based on analysis of scanned images are progressed with slow paces, and algorithms and functions fail to accommodate user's actual needs. This problem is caused due to two reasons. On one hand, the cargoes are diversified and complicated, and it is hard to find effective features and regular patterns for effective classification. On the other hand, the scanning devices are located in distributed positions, and customs offices keep the scanned images secret such that it is hard to acquire sufficient image data for training a classifier. In addition, image classification and recognition based on mass data analysis imposes higher requirements on algorithms and computing hardware, which thereby brings difficulties to the researches.

At present, researches into the classification and recognition of cargoes are necessary and feasible. On one hand, the problems present in the intelligent inspection are well recognized in the industry and the academic field. For example, the European Union has created a XtRAYner project in the FP7 plan, which is a cross-manufacture intelligent inspection platform. This project is mainly directed to collecting and annotating data, and has launched a research into basic algorithms. On the other hand, image understanding and pattern recognition have gained rapid development in recent years. Advanced algorithms suitable for mass data classification and recognition, such as a Conditional Random Field and deep learning theory are getting perfect, such that the automatic classification and recognition of scanned images of containers will become feasible.

SUMMARY

In view of the above, a fluoroscopic inspection system and method for automatic classification and recognition of cargoes are desired.

According to one aspect of the present disclosure, a fluoroscopic inspection method for automatic classification and recognition of cargoes is provided. The method includes: performing scanning and imaging for a container by using an X-ray scanning device to acquire a scanned image; segmenting the scanned image into small regions each having similar gray scales and texture features; extracting features of the small regions; generating a classifier according to annotated images, and/or storing or updating an existing classifier; and recognizing the small regions by using the classifier according to the extracted features, to obtain a probability of each small region pertaining to a certain category of cargoes, and merging the small regions to obtain large regions each representing a category.

Optionally, the method further includes: estimating a quantity of each category of cargoes, and submitting a result to the inspecting terminal.

Optionally, the method includes a training stage and/or a recognition stage.

Optionally, in the training stage, firstly, after scanned images of cargoes in containers are acquired, each of the scanned images is pre-segmented into small regions each having similar gray scales and texture features, and features of the small regions are extracted; subsequently, each of the scanned images is annotated according to a Manifest corresponding to each of the scanned images, and small regions that pertain to the same category and are adjacent to or interconnected with each other are merged into a large region; and finally, features of all the small regions in each of the large regions constitute a feature cluster, and the classifier is trained according to the feature clusters of the known categories, for subsequent recognition.

Optionally, in the training stage, a plurality of features are acquired by using a SIFT or MR8 operator, and the plurality of features are fused by using a feature fusion or decision fusion method to extract the features; further, the extracted features are organized by Dictionary learning.

Optionally, in the training stage, a sub-category image database is acquired by manually annotating the collected scanned images.

Optionally, in the recognition stage, firstly, cargoes in a container are scanned, and the scanned image is pre-segmented to generate several small regions each being relatively consistent in terms of gray scale and texture; subsequently, features of the small regions are extracted, and the small regions are recognized by using a classifier generated by means of training according to the extracted features to obtain probabilities that the small regions pertain to various categories of cargoes; and finally, a probabilistic graphic model is constructed by using the probabilities and correlations between adjacent small regions, and the small regions are merged to obtain large regions each representing a category, thereby completing cargo classification.

Optionally, in the recognition stage, the probabilistic graphical model is constructed by using a Hide Markov Mode, a Conditional Random Field, or a Structure Output Prediction; or the small regions are directly merged according to similarities, and a comprehensive category is output to serve as a category of a region resulted from the merge.

Optionally, after the recognition stage, the method further includes one of more of the following:

1) displaying different cargoes using different colors according to categories of the cargoes, informing the device operators how many categories the cargoes cover, and which category each category of the cargoes pertains to;

2) displaying at a click position in a certain region a category of cargoes and a minimum possible weight and a maximum possible weight of the category of cargoes according to a click operation of a device operator;

3) if a result is different from a manually input category, highlighting the difference with a color on the scanned image; and 4) automatically analyzing a Manifest to obtain a cargo category and corresponding weight information, and if a result is different from an automatic analysis result, highlighting the difference with a color on the image.

In the training stage, a large number of scanned images of the cargoes in the container are needed, the number reaching a magnitude of 100 thousand frames and above. Optionally, in the training stage, firstly, after scanned images of cargoes in containers are acquired, each of the scanned images is pre-segmented into small regions each having similar gray scales and texture features, which are referred to as super pixels, and features of the small regions are extracted; subsequently, each of the scanning images is annotated according to a Manifest corresponding to each of the scanned images, i.e., clearly indicating which category of cargoes each of the small regions pertains to, and small regions that pertain to the same category and are adjacent to or interconnected with each other are merged into a large region, which is referred to as a cluster; and finally, features of all the small regions in each of the large regions constitute a feature cluster, and a classifier is trained according to the feature clusters of the known categories, for subsequent recognition. Wherein, the number of categories that can be recognized in the recognition stage depends on the number of categories into which the cargoes are classified in the annotation stage. Due to transmission and projection of the scanned images, the surface profile features of the physical objects are absolutely lost, which brings great difficulties to the recognition. If the number of categories is too large, accuracy in recognition may be reduced. To achieve a practically-valued classification result, the inventor classifies cargoes into 22 categories according to the regulations specified in the Norm Declares Contents for the Customs Import and Export Goods of the People's Republic of China.

With respect to the method of feature extraction, a plurality of features may be acquired by using such operators as a scale-variant feature transform (SIFT) or maximum response sets (MR8) operator, and the plurality of features may be fused by using a feature fusion or decision fusion method, to acquire key features.

In the training stage, each of the small regions (super pixel) in each of the scanned images includes a large number of features. In this regard, a training image database may generate a mass feature database. These features may be effectively organized by Dictionary learning. Specifically, similar features are clustered into a word, and a large number of words in turn constitute a dictionary. In this regard, features of each of the small regions may be transformed into a histogram of corresponding words in the dictionary. The histogram is considered as a final feature of the small region. Wherein, a dictionary is formed in two ways: one is Kmeans and then the regions are described by using bag of words (BOW); and the other is K singular value decomposition (K-SVD) and then the regions are described by using sparse representation. After small regions that pertain to the same category and are adjacent to or interconnected with each other are merged into a large region (cluster), each large region includes a cluster of histogram features, and this cluster of histogram features pertain to a same category.

Optionally, in the training stage, a sub-category image database is acquired by manually annotating the collected scanned images, to generate or to subsequently update a classifier.

Optionally, in the recognition stage, firstly, cargoes in a container are scanned, and the scanned image is pre-segmented to generate several small regions (super pixels) that are relatively consistent in terms of gray scale and texture; subsequently, features of the small regions are extracted, and the small regions are recognized by using a classifier generated by means of training according to the extracted features, to obtain a probability of each small region pertaining to a certain category of cargoes; and finally, a probabilistic graphic model is constructed by using the probabilities and correlations between adjacent small regions, and the small regions are merged to obtain large regions each representing a category, thereby completing cargo classification. Wherein, the probabilistic graphic model may employ a Hide Markov Mode (HMM), a Conditional Random Field (CRF), or a Structure Output Prediction (SOP). Alternatively, these complicated models may not be constructed, and instead, the small regions may be directly merged according to similarities thereof, and then a comprehensive category is output as a category of the merged region.

According to another aspect of the present disclosure, a fluoroscopic inspection device for automatic classification and recognition of cargoes is provided, including:

a processor, a memory, configured to store instructions executable by the processor, wherein the processor is configured to:

perform scanning and imaging for a container by using an X-ray scanning device to acquire a scanned image;

segment the scanned image into small regions each having similar gray scales and texture features;

extract features of the small regions;

generate a classifier according to annotated images, and/or store or update an existing classifier; and recognize the small regions by using the classifier according to the extracted features, to obtain a probability of each small region pertaining to a certain category of cargoes, and merge small regions to obtain large regions each representing a category.

Optionally, the device further includes an inspecting terminal; wherein the processor is further configured to estimate a quantity of each category of cargoes, and submit a result to the inspecting terminal.

Optionally, the automatic classification and recognition performed by the processor of the device for the cargoes includes a training stage and/or a recognition stage.

Optionally, in the training stage, firstly, after scanned images of cargoes in containers are acquired, each of the scanned images is pre-segmented into small regions each having similar gray scales and texture features, and features of the small regions are extracted; subsequently, each of the scanned images is annotated according to a Manifest corresponding to the scanned image, and small regions that pertain to the same category and are adjacent to or interconnected with each other are merged into a large region; and finally, features of all the small regions in each of the large regions constitute a feature cluster, and the classifier is trained according to the feature clusters of the known categories, for subsequent recognition.

Optionally, in the training stage, a plurality of features are acquired by using a SIFT or MR8 operator, and the plurality of features are fused by using a feature fusion or decision fusion method to extract the features; further, the extracted features are organized by Dictionary learning.

Optionally, in the training stage, a sub-category image database is acquired by manually annotating the collected scanned images.

Optionally, in the recognition stage, firstly, cargoes in a container are scanned, and a scanned image is pre-segmented to generate several small regions each being relatively consistent in terms of gray scale and texture; subsequently, features of the small regions are extracted, and the small regions are recognized by using a classifier generated by means of training according to the extracted features, to obtain a probability of each small region pertaining to a certain category of cargoes; and finally, a probabilistic graphic model is constructed by using the probabilities and correlations between adjacent small regions, and the small regions are merged to obtain large regions each representing a category, thereby completing cargo classification.

Optionally, in the recognition stage, the probabilistic graphical model is constructed by using a Hide Markov Mode, a Conditional Random Field, or a Structure Output Prediction; or the small regions are directly merged according to similarities, and a comprehensive category is output to serve as a category of a region resulted from the merge.

Optionally, in the recognition stage, a table of possible maximum gray scales and minimum gray scales against different thicknesses for each category of cargoes is constructed; and a minimum possible weight and a maximum possible weight of a cargo are obtained by reference to a gray scale of an image and the table of maximum gray scales and minimum gray scales.

Optionally, the device includes a user interface, and after the recognition stage, the user interface is configured to perform one or more of:

1) display different cargoes using different colors according to categories of the cargoes, inform the device operators how many categories the cargoes cover, and which category each category of the cargoes pertains to;

2) display at a click position in a certain region a category of cargoes and a minimum possible weight and a maximum possible weight of the category of cargoes according to a click operation of a device operator;

3) if a result is different from a manually input category, highlight the difference with a color on the scanned image; and 4) if the processor is further configured to automatically analysis a Manifest to obtain a cargo category and corresponding weight information, and if a result is different from an automatic analysis result, highlight the difference with a color on the image.

According to another aspect of the present disclosure, a non-transitory computer readable storage medium is provided, when instructions in the storage medium are executed by a processor of a device, the device is enabled to perform a method for automatic classification and recognition of cargoes, the method including:

performing scanning and imaging for a container by using an X-ray scanning device to acquire a scanned image;

segmenting the scanned image into small regions each having similar gray scales and texture features;

extracting features of the small regions;

generating a classifier according to annotated images, and/or storing or updating an existing classifier; and recognizing the small regions by using the classifier according to the extracted features, to obtain a probability of each small region pertaining to a certain category of cargoes, and merging small regions to obtain large regions each representing a category.

Optionally, the method includes a training stage and/or a recognition stage.

DISCLOSURE BRIEF DESCRIPTION OF THE DRAWINGS

With reference to the embodiments described hereinafter, various details and aspects of the present disclosure would be clearly illustrated. In the drawings.

DETAILED DESCRIPTION

Figure 1:
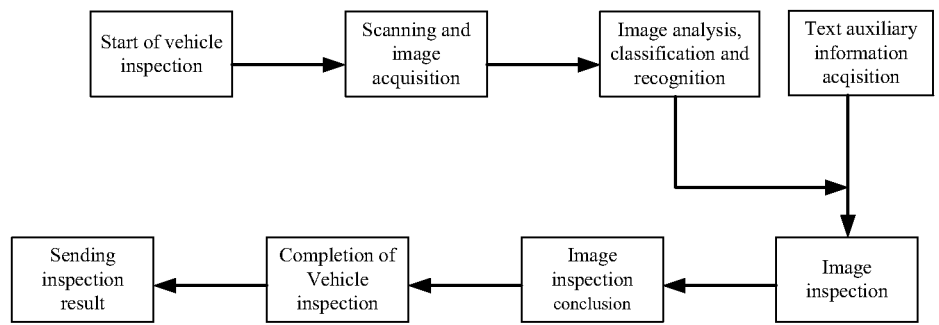
FIG. 1 is a flowchart of an inspection process according to an embodiment of the present disclosure.

To make the objectives, structures, and advantages of the present disclosure clearer, the present disclosure is further described in detail with reference to the attached drawings. For brevity of description, only one of multiple possible configurations is illustrated in the drawings and the description. A person skilled in the art will understand that without departing from the spirit of the present disclosure, various modifications and replacements may be made to the embodiments hereinafter of the present disclosure.

Category Description

In the present disclosure, the scanned cargoes are classified into 22 categories according to the Harmonized Commodity Description and Coding System (HS) formulated by the World Customs Organization, and the regulations specified in the Norm Declares Contents for the Customs Import and Export Goods of the People's Republic of China. Briefly, these 22 categories are described as follows:

1. Live animals and animal products.
2. Vegetable products.
3. Animal or vegetable fats and oils and their cleavage products; prepared edible fats; animal or vegetable waxes.
4. Prepared foodstuffs; beverages, spirits, and vinegar; tobacco and manufactured tobacco substitutes.
5. Mineral products.
6. Products of the chemical or allied industries.
7. Plastics and articles thereof; rubber and articles thereof.
8. Raw hides and skins, leather, furskins and articles thereof; saddlery and harness; travel goods, handbags and similar containers; articles of animal gut (other than silk-worm gut).
9. Wood and articles of wood; wood charcoal; cork and articles of cork; manufacturers of straw, of esparto or of other plaiting materials; basketware and wickerwork.
10. Pulp of wood or of other fibrous cellulosic material; waste and scrap of paper or paperboard; paper and paperboard and articles thereof.
11. Textile and textile articles.

12. Footwear, headgear, umbrellas, sun umbrellas, walking sticks, seatsticks, whips, riding-crops and parts thereof; prepared feathers and articles made therewith; artificial flowers; articles of human hair.

13. Articles of stone, plaster, cement, asbestos, mica or similar materials; ceramic products; glass and glassware.

14. Natural or cultured pearls, precious or semiprecious stones, precious metals, metals clad with precious metal, and articles thereof; imitation jewelry; coin.

15. Base metals and articles of base metal.

16. Machinery and mechanical appliances; electrical equipment; parts thereof; sound recorders and reproducers, television image and sound recorders and reproducers, and parts and accessories of such articles.

17. Vehicles, aircraft, vessels and associated transport equipment.

18. Optical, photographic, cinematographic, measuring, checking, precision, medical or surgical instruments and apparatus; clocks and watches; musical instruments; parts and accessories thereof.

19. Arms and ammunition; parts and accessories thereof.

20. Miscellaneous manufactured articles.

21. Works of art, collectors' pieces and antiques.

22. Articles of special trade and goods unclassified.

It should be noted that in the present disclosure, cargoes are classified into the above 22 categories only for adaptation to the practical application. In practice, subsets of the 22 categories or even refined classifications (for example, the 98 sub-categories under the 22 categories) may be applied.

According an embodiment of the present disclosure, a fluoroscopic inspection system for automatic classification and recognition of cargoes includes: an image data acquiring unit, configured to perform scanning and imaging for a container by using an X-ray scanning device to acquire a scanned image; an image segmenting unit, configured to segment the scanned image into small regions each having similar gray scales and texture features; a feature extracting unit, configured to extract features of the small regions; a training unit, configured to generate a classifier according to annotated images; and a classification and recognition unit, configured to recognize the small regions by using the classifier according to the extracted features to obtain a probability of each small region pertaining to a certain category of cargoes, and merge small regions to obtain large regions each representing a category.

FIG. 1 is a flowchart of an inspection process according to an embodiment of the present disclosure. For example, in inspection of a roll container, after a vehicle enters and the inspection is started, the system firstly scan the vehicle to acquire a fluoroscopy image thereof; the scanned fluoroscopy image is inspected by means of image analysis and classification and recognition described hereinafter and in combination with auxiliary textual information; after a result of classification and recognition is acquired, the result may be sent to an inspection terminal; and after the inspection of the vehicle is complete, an inspection result is sent.

The fluoroscopic inspection system for automatic classification and recognition of cargoes according to the present disclosure is capable of analyzing a scanning image of a container, categorizing the scanning image into several parts according to feature similarities, and analyzing which category the cargoes corresponding to each of the parts pertain to. According to the present disclosure, a probability of each small region in the scanning image pertaining to a certain category of cargoes is determined according to the extracted features, thereby improving efficiency and accuracy of holistic recognition of cargoes. In addition, with the configurations described in the embodiments of the present disclosure, as the quantities of cargo to be recognized ever increase, efficiency and accuracy of cargo recognition may be further improved. According to the present disclosure, a comparison against the Manifest may be made according to the classification result, so as to discover illegally smuggled articles. The quantity of cargoes may be estimated according to the category and the area of cargoes in the scanned image. The estimated quantity of cargoes may be compared against the Manifest, so as to discover smuggling of the concealed quantity of cargoes. Further, the tax amount may be automatically estimated based on the tax rate according to the quantity of cargoes.

Optionally, the automatic classification and recognition performed by the system for the cargoes includes a training stage and a recognition stage. However, a person skilled in the art will understand that, in practical application, when there are a sufficient number of sub-category samples, the automatic classification and recognition performed by the system for the cargoes may no longer include the training stage, since in this case, the system has acquired sufficient "words" constructed by aggregation of features.

Figure 2:
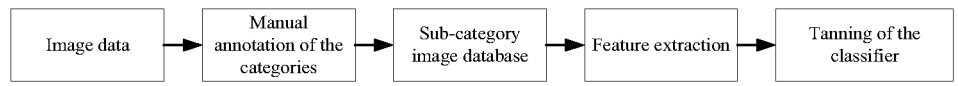
FIG. 2 is a schematic view of a training stage according to an embodiment of the present disclosure.

Training Stage (as Illustrated in FIG. 2)

1. Image Acquisition

To meet the requirements of training the classifier, about 100 images are collected with respect to each category of cargoes, and that these images involve articles as distinct with each other as possible. For example, with respect to foods, foods in different categories and of different forms and packages are included as much as possible. In addition, with respect to images of living beings or weapons that are hard to be acquired, similar simulated articles are used for image scanning.

2. Manual Annotation of the Category

The collected images are manually annotated (i.e., image annotation). A typical annotation method is giving detailed annotation indicating each of the pixels in an image or which region in an image pertains to which category. After the annotation, the sub-category image database as illustrated in FIG. 1 is formed. In addition, a classifier is generated according to the annotated images.

3. Feature Extraction

Firstly, features of an annotated region in an image are extracted. Typically, the feature is represented by a dense image descriptor. The image descriptor may be obtained through various algorithms, for example, the Histogram of Oriented Gradient (HOG) feature, the MR8, the SIFT, and the like. Optionally, according to the present disclosure, Decision Fusion is performed by using these three types of features. Therefore, during extraction of the features, dense HOG, MR8, and SIFT features are separately extracted. The term "dense" herein refers to positions of the feature extraction points in an image are set at small and even intervals. The algorithms may be implemented by using open source software, such as opencv, vlfeat, and other open source libraries.

The image is segmented by using an image segmentation algorithm. Without loss of generality, segmentation is conducted by using a statistical region merging method, and the obtained regions after the segmentation are referred to as super pixels. The three types of features extracted in a super pixel region are averaged, and thus a feature description of the pixel is acquired. On the same image, small regions that pertain to a same category and are adjacent to or interconnected with each other are merged into a large region, which is referred to as a cluster. Each cluster includes at least one super pixel. However, a cluster typically includes tens to even hundreds of super pixels. Optionally, the features of the cluster are described by means of BOW. BOW feature generated using HOG are referred to as HOG-BOW, BOW features generated using MR8 are referred to as MR8-BOW, and BOW features generated using SIFT are referred to as SIFT-BOW. To fully utilize the samples, a cluster is divided into uniform blocks according to the area of a cluster, such that each cluster includes at least 20 BOW features. In this case, each of the BOW features is formed of three high dimensional vectors {HOG-BOW, MR8-BOW, SIFT-BOW}.

4. Training of the Classifier

The classifier is trained by using the features obtained in the above-described $3^{rd}$ step. According to the above description, with respect to the three types of features, three types of classifiers are constructed: an HOG classifier, an MR8 classifier, and an SIFT classifier, respectively. Each classifier covers about 100 images, and each image includes at least 20 BOW features. Therefore, each classifier is a 22-category classifier, and each category includes at least 2000 samples of features. Each of the classifiers may be a linear classifier, a nonlinear classifier, an integrated classifier, a neural network classifier, such as a Fisher classifier, a SVM classifier, a Boosting classifier, a random forest classifier, a multilayer perceptron classifier, and the like. Without loss of generality, a SVM classifier is adopted in this embodiment. The SVM classifier may be implemented using various open source software solutions, for example, Lib-SVM, or the like.

In addition, feature fusion may also be performed on the three types of features. However, since the dimensionalities of the three types of features are high, the decision fusion is optionally used herein.

After the classifier is obtained, classification may be performed.

Figure 3:
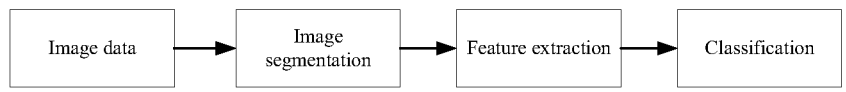
FIG. 3 is a schematic view of a recognition stage according to an embodiment of the present disclosure.

Classification and Recognition Stage (as Illustrated in FIG. 3)

1. Image Segmentation

Segmentation of an unknown image is performed by using the same method as the segmentation of images in the above $3^{rd}$ step in the training stage. The regions obtained through segmentation are all super pixels.

2. Feature Extraction

The basic method of feature extraction here is similar to the feature extraction method in the above $3^{rd}$ step in the training stage. The difference therebetween lies in that in the feature extraction here, no classification result is provided, and thus the features of a cluster cannot be accurately obtained. Therefore, with respect to each super pixel, the features generated within a specific area around the super pixel (by reference to an area of the region divided during generation of the cluster) form a virtual local cluster, and the BOW features of the cluster are calculated. In this case, features in a super pixel are not averaged and instead, BOW features are directly generated.

Unlike the case where each cluster includes at least 20 BOW features during the training stage, in this case, the local cluster includes only one BOW feature. This BOW feature consists of three high dimensional vectors {HOG-BOW, MR8-BOW, SIFT-BOW}.

3. Classification

The three high dimensional vectors {HOG-BOW, MR8-BOW, SIFT-BOW} are respectively classified by the trained classifier, to obtain three-dimensional confidence vectors of the three vectors pertaining to the 22 categories. Each value in the vectors indicates a confidence of a feature pertaining to a category.

A result of decision fusion is obtained by calculating any one of summation, average, and maximum of the three-dimensional confidences. Optionally, the three-dimensional confidence vectors are averaged to obtain a one-dimensional confidence vector. Each value is a confidence of a super pixel pertaining to a category. The maximum value in the vector indicates the category and confidence of the super pixel.

Optionally, after confidences of all of the super pixels are obtained, a confidence graph may be post-processed. Without loss of generality, a more accurate result may be obtained by means of the CRF.

Estimation of the Cargo Weight

In the X-ray imaging system, the gray scale of each substance is computable by a unit of thickness (for example, 1 cm), or the gray scale may be considered as determinate. Therefore, a possible table of maximum gray scales and minimum gray scales against different thicknesses is constructed for the 22 categories of cargoes.

In the above 3rd step in the recognition stage, the categories of the cargoes have been obtained. By further reference to a gray scale of an image and the above table of gray scales, a minimum possible weight and a maximum possible weight of a cargo may be readily obtained.

Human-Machine Interaction

The classification and recognition method according to the present disclosure may employ various human-machine interaction methods, which assist a device operator to more effectively analyze images. The method may include but not limited to:

1. As a method of human-machine interaction, after classification and recognition, different cargoes may be indicated using different colors according to the categories of the cargoes, informing the device operators how many categories the cargoes cover, and which category of the 22 categories each category of cargoes pertains to.

2. As a method of human-machine interaction, after classification and recognition, a category of cargoes and a minimum possible weight and a maximum possible weight of the category of cargoes at a click position are displayed in a certain region (for example, proximate a cursor of a mouse) according to a click operation of the device operator.

3. As a method of human-machine interaction, the device operator may manually input a cargo category (a general category the cargoes pertain to). After classification and recognition, if a result is different from the manually input category, the difference is highlighted with a color on the image.

4. As a method of human-machine interaction, the system automatically analyzes the Manifest (an electronic Manifest or a digitalized Manifest based on character recognition), to obtain a cargo category and corresponding weight information. After classification and recognition, if a result is different from the automatic analysis result, the difference is highlighted with a color on the image.

According to an embodiment of the present disclosure, a fluoroscopic inspection method of automatic classification and recognition of cargoes is provided. The method includes: performing scanning and imaging for a container by using an X-ray scanning device to acquire a scanned image; segmenting the scanned image into small regions each having similar gray scales and texture features; extracting features of the small regions; generating a classifier according to annotated images; and recognizing the small regions by using the classifier according to the extracted features to obtain a probability of each small region pertaining to a certain category of cargoes, and merging the small regions to obtain large regions each representing a category.

Optionally, the method further includes: estimating the quantity of each category of cargoes, and submitting a result to the inspecting terminal.

Optionally, the method includes a training stage and a recognition stage.

Optionally, in the training stage, firstly, after scanned images of cargoes in containers are acquired, each of the scanned images is pre-segmented into small regions each having similar gray scales and texture features, and features of the small regions are extracted; subsequently, each of the scanned images is annotated according to a Manifest corresponding to the scanned image, and small regions that pertain to the same category and are adjacent to or interconnected with each other are merged into a large region; and finally, features of all the small regions in each of the large regions constitute a feature cluster, and the classifier is trained according to the feature clusters of the known categories, for subsequent recognition.

Optionally, in the training stage, a plurality of features are acquired by using an SIFT or MR8 operator, and the plurality of features are fused by using a feature fusion or decision fusion method to extract the features; further, the extracted features are organized by Dictionary learning.

Optionally, in the training stage, a sub-category image database is acquired by manually annotating the collected scanned images.

Optionally, in the recognition stage, firstly, cargoes in a container are scanned, and the scanned image is pre-segmented to generate several small regions each being relatively consistent in terms of gray scale and texture; subsequently, features of the small regions are extracted, and the small regions are recognized by using a classifier generated by means of training according to the extracted features to obtain a probability of each small region pertaining to a certain category of cargoes; and finally, a probabilistic graphic model is constructed by using the probabilities and correlations between adjacent small regions, and the small regions are merged to obtain large regions each representing a category, thereby completing cargo classification.

Optionally, in the recognition stage, the probabilistic graphical model is constructed by using a Hide Markov Mode, a Conditional Random Field, or a Structure Output Prediction; or the small regions are directly merged according to similarities, and a comprehensive category is output to serve as a category of a region resulted from the merge.

With the fluoroscopic inspection system for automatic classification and recognition of cargoes according to the present disclosure, scanned images of bulk cargoes in a container are segmented, cargoes are classified and recognized, and the quantity of the cargoes may be further estimated. In addition, pseudo-colors may be added on the images for various categories of cargoes, which greatly facilitates inspection of the images. If the number of categories after image classification is inconsistent with the number of categories specified in the Manifest, or the quantities are inconsistent, the system notifies the inspector that information of the cargoes may be concealed. If the tax rates of various categories of cargoes can be acquired via query, the system is capable of further estimating the tax amount for reference.

Although the present disclosure has been illustrated and described in detail with reference to the drawings and foregoing description, such illustration and description are to be considered illustrative or exemplary but not limiting. The present disclosure is not limited to the disclosed embodiments. Other variations to the disclosed embodiments may be understood and implemented by a person skilled in the art in practicing the claimed disclosure, from a study of the drawings, the disclosure and the appended claims.

In the claims and specification, the word "comprising" or "comprises" does not exclude other elements or steps, and the infinite article "a" or "an" does not exclude a plurality. A single element or another unit may fulfill functions of several feature recited in the claims. The mere fact that certain measures are recited in mutually different dependent claims does not indicate that a combination of these measures cannot be used advantageously. Any reference signs in the claims should not be construed as limiting the scope.

What is claimed is:

1. A fluoroscopic inspection method for automatic classification and recognition of cargoes, comprising:
    performing scanning and imaging for a container by using an X-ray scanning device to acquire a scanned image;
    segmenting the scanned image into small regions according to gray scales and texture features, such that the gray scales and the texture features of the image in each small region are uniform;
    extracting features of the small regions;
    generating a classifier according to annotated images, and/or storing or updating an existing classifier; and
    recognizing the small regions by using the classifier according to the extracted features, to obtain a probability of each small region pertaining to a certain category of cargoes, and merging small regions to obtain large regions each representing a category,
    wherein the method further comprises a training stage, and
    wherein, in the training stage,
    firstly, after scanned images of cargoes in containers are acquired, each of the scanned images is pre-segmented into small regions according to similarities in terms of gray scales and texture features, and features of the small regions are extracted;
    subsequently, each of the scanned images is annotated according to a Manifest corresponding to the scanned image, and small regions that pertain to the same category and are adjacent to or interconnected with each other are merged into a large region; and
    finally, features of all the small regions in each of the large regions constitute a feature cluster, and the classifier is trained according to the feature clusters of the known categories, for subsequent recognition.

2. The method according to claim 1, wherein, the method further comprises:
    estimating a quantity of each category of cargoes, and submitting a result to an inspecting terminal.

3. The method according to claim 1, wherein, in the training stage, a sub-category image database is acquired by manually annotating the collected scanned images.

4. The method according to claim 1, wherein, in the recognition stage, firstly, cargoes in a container are scanned, and a scanned image is pre- segmented to generate several small. regions each being relatively consistent in terms of gray scale and texture; subsequently, features of the small regions are extracted, and the small regions are recognized by using a classifier generated by means of training according to the extracted features, to obtain a probability of each small region pertaining to a certain category of cargoes; finally, a probabilistic graphic model is constructed by using the probabilities and correlations between adjacent small regions, and the small regions are merged to obtain large regions each representing a category, thereby completing cargo classification.

5. The method according to claim 4, wherein, in the recognition stage, the probabilistic graphical model is constructed by using a Hide Markov Mode, a Conditional Random Field, or a Structure Output Prediction; or the small regions are directly merged according to similarities, and a comprehensive category is output to serve as a category of a region resulted from the merge.

6. The method according to claim 4, wherein, in the recognition stage, a table of possible maximum gray scales and minimum gray scales against different thicknesses for each category of cargoes is constructed; and a minimum possible weight and a maximum possible weight of a cargo are obtained by reference to a gray scale of an image and the table of maximum gray scales and minimum gray scales.

7. The method according to claim 6, wherein, after the recognition stage, the method further comprises one of more of the following:
1) displaying different cargoes using different colors according to categories of the cargoes, informing an operators how many categories the cargoes cover, and which category each category of the cargoes pertains to;
2) displaying at a click position in a certain region a category of cargoes and a minimum possible weight and a maximum possible weight of the category of cargoes according to a click operation of an operator;
3) if a result is different from a manually input category, highlighting the difference with a color on the scanned image; and
4) automatically analyzing a Manifest to obtain a cargo category and corresponding weight information, and if a result is different from an automatic analysis result, highlighting the difference with a color on the image.

8. A fluoroscopic inspection device for automatic classification and recognition of cargoes, comprising:
a processor,
a memory, configured to store instructions executable by the processor,
wherein the processor is configured to:
perform scanning and imaging for a container by using an X-ray scanning device to acquire a scanned image;
segment the scanned image into small regions according to gray scales and texture features, with the gray scale and the texture feature of the image are uniform in each small region;
extract features of the small regions;
generate a classifier according to annotated images, and/or store or update an existing classifier; and
recognize the small regions by using the classifier according to the extracted features, to obtain a probability of each small region pertaining to a certain category of cargoes, and merge small regions to obtain large regions each representing a category,
wherein the automatic classification and recognition performed by the processor of the device for the cargoes comprises a training stage, and wherein, in the training stage,
firstly, after scanned images of cargoes in containers are acquired, each of the scanned images is pre-segmented into small regions according to similarities in terms of gray scales and texture features, and features of the small regions are extracted;
subsequently, each of the scanned images is annotated according to a Manifest corresponding to the scanned image, and small regions that pertain to the same category and are adjacent to or interconnected with each other are merged into a large region; and
finally, features of all the small regions in each of the large regions constitute a feature cluster, and the classifier is trained according to the feature clusters of the known categories, for subsequent recognition.

9. The device according to claim 8, wherein, the device further comprises an inspecting terminal; wherein the processor is further configured to estimate a quantity of each category of cargoes, and submit a result to the inspecting terminal.

10. The device according to claim 8, wherein, in the training stage, a sub-category image database is acquired by manually annotating the collected scanned images.

11. The device according to claim 8, wherein, in the recognition stage, firstly, cargoes in a container are scanned, and a scanned image is pre-segmented to generate several small regions each being relatively consistent in terms of gray scale and texture; subsequently, features of the small regions are extracted, and the small regions are recognized by using a classifier generated by means of training according to the extracted features, to obtain a probability of each small region pertaining to a certain category of cargoes; and finally, a probabilistic graphic model is constructed by using the probabilities and correlations between adjacent small regions, and the small regions are merged to obtain large regions each representing a category, thereby completing cargo classification.

12. The device according to claim 11, wherein, in the recognition stage, the probabilistic graphical model is constructed by using a Hide Markov Mode, a Conditional Random Field, or a Structure Output Prediction; or the small regions are directly merged according to similarities, and a comprehensive category is output to serve as a category of a region resulted from the merge.

13. The device according to claim 11, wherein, in the recognition stage, a table of possible maximum gray scales and minimum gray scales against different thicknesses for each category of cargoes is constructed; and a minimum possible weight and a maximum possible weight of a cargo are obtained by reference to a gray scale of an image and the table of maximum gray scales and minimum gray scales.

14. The device according to claim 13, wherein, the device comprises a user interface, and after the recognition stage, the user interface is configured to perform one or more of:
1) display different cargoes using different colors according to categories of the cargoes, inform an operators how many categories the cargoes cover, and which category each category of the cargoes pertains to;
2) display at a click position in a certain region a category of cargoes and a minimum possible weight and a maximum possible weight of the category of cargoes according to a click operation of an operator;
3) if a result is different from a manually input category, highlight the difference with a color on the scanned image; and
4) if the processor is further configured to automatically analysis a Manifest to obtain a cargo category and corresponding weight information, and if a result is different from an automatic analysis result, highlight the difference with a color on the image.

15. A non-transitory computer readable storage medium, when instructions in the storage medium are executed by a processor of a device, the device is enabled to perform a method for automatic classification and recognition of cargoes, the method comprising:

performing scanning and imaging for a container by using an X-ray scanning device to acquire a scanned image;

segmenting the scanned image into small regions according to similarities in terms of gray scales and texture features, such that the gray scales and the texture features of the image in each small region are relatively uniform;

extracting features of the small regions;

generating a classifier according to annotated images, and/or storing or updating an existing classifier; and recognizing the small regions by using the classifier according to the extracted features, to obtain a probability of each small region pertaining to a certain category of cargoes, and merging small regions to obtain large regions each representing a category, wherein the method further comprises a training stage, and wherein in the training stage, firstly, after scanned images of cargoes in containers are acquired, each of the scanned images is pre-segmented into small regions according to similarities in terms of gray scales and texture features, and features of the small regions are extracted;

subsequently, each of the scanned images is annotated according to a Manifest corresponding to the scanned image, and small regions that pertain to the same category and are adjacent to or interconnected with each other are merged into a large region; and finally, features of all the small regions in each of the large regions constitute a feature cluster, and the classifier is trained according to the feature clusters of the known categories, for subsequent recognition.

* * * * *